United States Patent
David et al.

(10) Patent No.: US 10,933,708 B2
(45) Date of Patent: Mar. 2, 2021

(54) VEHICLE SUSPENSION UNIT

(71) Applicant: Ford Global Technologies, LLC, Dearborn, MI (US)

(72) Inventors: Wolfgang David, Aachen (DE); Paul Zandbergen, Würselen (DE); Thomas Gerhards, Niederzier (DE); Ralf Hintzen, Aachen (DE); Marc Simon, Cologne (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/208,232

(22) Filed: Dec. 3, 2018

(65) Prior Publication Data
US 2019/0168560 A1  Jun. 6, 2019

(30) Foreign Application Priority Data

Dec. 4, 2017 (DE) .................... DE102017221776.6

(51) Int. Cl.
*B60G 11/36* (2006.01)
*B60G 11/42* (2006.01)
*B60G 11/38* (2006.01)

(52) U.S. Cl.
CPC .............. *B60G 11/38* (2013.01); *B60G 11/36* (2013.01); *B60G 11/42* (2013.01);
(Continued)

(58) Field of Classification Search
CPC ......... B60G 11/38; B60G 11/04; B60G 11/36; B60G 11/42; B60G 11/34; B60G 2202/14; B60G 2202/112; B60G 2202/143; B60G 2204/4502; B60G 2204/45; B60G 7/04; B60G 17/023
(Continued)

(56) References Cited

U.S. PATENT DOCUMENTS 2,973,952 A * 3/1961 Heintzelman ............ B60G 7/04
267/30
4,796,910 A * 1/1989 Starr, Sr. .................. B60G 7/04
267/30
(Continued)

FOREIGN PATENT DOCUMENTS

DE 202016102649 U1 6/2016
FR 2970903 A1 8/2012

OTHER PUBLICATIONS

Firestone Expands R4tech Product Line to Fit 2010-2011 Trucks, Off-Road.com Press Release, Dec. 30, 2010.

*Primary Examiner* — Keith J Frisby
(74) *Attorney, Agent, or Firm* — Raymond L. Coppiellie; Burgess Law Office, PLLC

(57) ABSTRACT

A longitudinal leaf spring device for suspending a motor vehicle body or chassis on a vehicle axle thereof. Leaf spring device including an elongated leaf spring unit, a coupling device connecting the leaf spring unit to the vehicle axle, and suspension unit arranged in a substantially vertical direction between a chassis and the axle. The suspension unit including suspension elements providing a spring-back force in the vertical direction and producing an active connection between the chassis and the axle when the distance between the chassis and axle exceeds a predetermined first deflection depth.

11 Claims, 5 Drawing Sheets

(52) U.S. Cl.
CPC .... *B60G 2202/112* (2013.01); *B60G 2202/14* (2013.01); *B60G 2202/143* (2013.01); *B60G 2204/45* (2013.01); *B60G 2204/4502* (2013.01)

(58) Field of Classification Search
USPC .... 280/124.17, 124.165; 267/45, 46, 30, 28, 267/29, 231, 233, 40
See application file for complete search history.

(56) References Cited

U.S. PATENT DOCUMENTS

| | | |
|---|---|---|
| 5,584,497 A | 12/1996 | Lander et al. |
| 7,500,688 B2 | 3/2009 | Mullican et al. |
| 8,490,992 B2 | 7/2013 | Juriga |

\* cited by examiner

VEHICLE SUSPENSION UNIT

CROSS-REFERENCE TO RELATED APPLICATIONS

Not Applicable.

BACKGROUND OF THE INVENTION

1. Field of the Invention

The present invention relates generally to a motor vehicle suspension; and more specifically to a vehicle suspension including an elongated leaf spring unit.

2. Description of Related Art

Elastic spring elements, positioned between a body of a motor vehicle as a sprung object and wheels of the vehicle as unsprung objects, enhance vehicle occupant driving comfort by reducing shock transfer, caused by bumps in the road, directly to the vehicle body. Contact between the wheels and the ground, necessary for force transmission, can be ensured even with bumps in the road. Vehicle body vibrations, caused by bumps in the road, are damped using shock absorbers mounted between the body and the wheel axles. The elastic spring elements may be, for example, elastic coil springs that are an integral, constituent part of the shock absorbers.

Motor vehicle suspensions also use longitudinal leaf spring assemblies. A longitudinal leaf spring assembly includes a leaf spring generally designed as a bent or curved elongated bar, made for example of steel. The leaf spring having a rectangular cross section. The leaf spring secured to the vehicle and extending in a vertical plane aligned parallel to a longitudinal axis or extension direction of the vehicle. The longitudinal leaf spring typically fastened in its central region to a vehicle axle, with each of its ends fastened to the vehicle chassis.

SUMMARY OF THE INVENTION

A vehicle suspension unit including an elongated leaf spring and a couple or connecting the leaf spring to a vehicle axle. A suspension unit, separate from the elongated leaf spring is positioned vertically between a vehicle chassis and the vehicle axle. The suspension unit including a plurality of suspension elements exerting a spring-back force. The suspension unit connected to the vehicle chassis and having a free end spaced from the vehicle axle at a predetermined first deflection depth between the free end of the suspension unit and the vehicle axle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
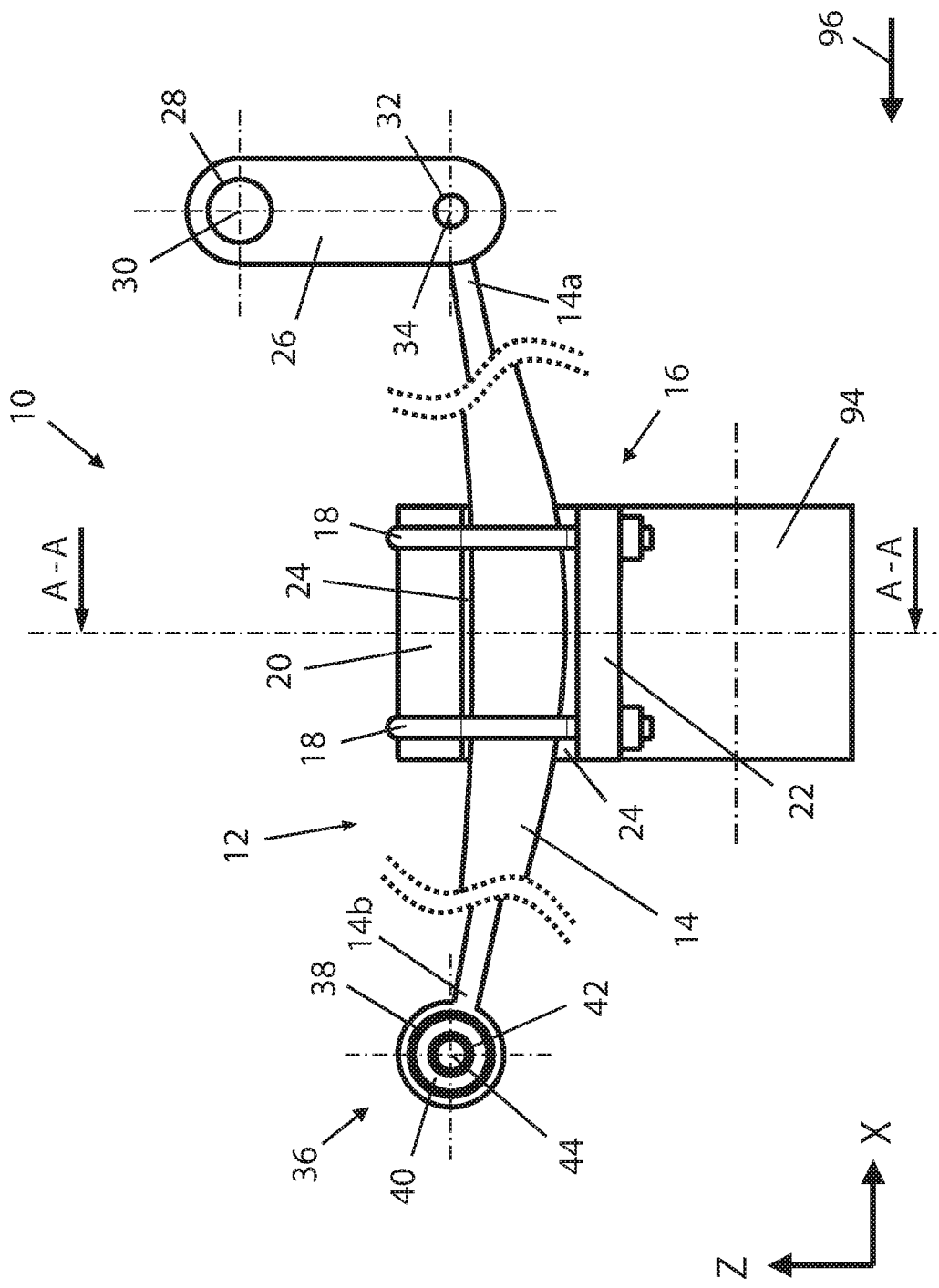
FIG. 1 is a diagrammatic, side view of a longitudinal leaf spring device according to the invention coupled to an axle of a motor vehicle.

FIG. 1 is a diagrammatic side view of an embodiment of a longitudinal leaf spring device 10 coupled to a left side of an axle 94 of a motor vehicle. The longitudinal leaf spring device 10 provides spring suspension of a motor vehicle body, for example a vehicle body of a truck. The axle 94 is a rigid rear axle of the truck extending between respective vehicle wheels. A second longitudinal leaf spring device 10 is provided symmetrically on the right side of the axle 94 of the motor vehicle.

The longitudinal leaf spring device 10 includes an elongated leaf spring unit 12 with a leaf spring element 14. Over 95% volume of the leaf spring element 14 made of a composite material, namely of a fiber/plastic composite. A carbon fiber reinforced epoxy resin is one example of the fiber/plastic composite. In the installation position illustrated in FIG. 1, the elongated leaf spring element 14 lies in a plane, X-Z plane, oriented perpendicular to the axle 94 of the vehicle and coinciding with the plane of the drawing. An extension direction or longitudinal axis of the leaf spring element 14 extends parallel to the X direction, and substantially parallel to a forward driving direction 96 of the motor vehicle which in the drawing plane of FIG. 1 runs from right to left. The leaf spring element 14 has a substantially rectangular cross section that varies along its longitudinal direction, indicated with the dotted dividing lines to obtain a predetermined spring characteristic of the leaf spring element 14.

The longitudinal leaf spring device 10 includes a coupling device or clamp 16 that mechanically couples the leaf spring element 14 to the axle 94 of the motor vehicle. The coupling device 16 includes a pair of U-shaped brackets 18 arranged with the U-shaped part or base on the top of and surrounding the leaf spring element 14 in its central region. Between the leaf spring element 14 and the U-shaped part of the U-shaped brackets 18 an upper transition element 20 of the coupling device 16 engages the leaf spring element 14, and between the leaf spring element 14 and the open part of the U-shaped brackets 18 is a lower transition element 22 of the coupling device 16 engaging the axle 94. The upper transition element 20 and the lower transition element 22 are made from steel. The U-shaped brackets 18 pass through full-length bores in the lower transition element 22 and are secured by threaded fasteners or nuts.

An acoustic separating element 24, for example an elastomer shaped part, adapts or conforms to the inner faces of the upper transition element 20 and lower transition element 22 and faces the leaf spring element 14. The acoustic separating element 24 also adapts or conforms to the outer contours of the leaf spring element 14 in the region of the coupling device 16. The acoustic separating element 24 acoustically decouples the leaf spring element 14 from the coupling device 16 during operation of the longitudinal leaf spring device 10. In the present configuration the acoustic separating element 24 is a single elastomer shaped part. In alternative embodiments the acoustic separating element may be formed as two separate elastomer shaped parts, one arranged between the upper transition element 20 and the leaf spring element 14, and one arranged between the lower transition element 22 and the leaf spring element 14.

A retaining bracket or link 26 connects to a vehicle chassis of the motor vehicle at a position arranged above one end of the leaf spring element 14. The retaining bracket 26, formed for example as a ladder frame, extends downwards from the vehicle chassis to the leaf spring element 14. The retaining bracket 26 is fitted with metal cylindrical bearing bushes 28, 32 spaced in the vertical, Z-direction. A metal cylinder bolt fixedly connected to the vehicle chassis forms an upper transverse axle 30 that extends through the upper bearing bush 28, wherein the retaining bracket 26 pivots relative to the vehicle chassis about the upper transverse axle 30.

A rear end 14a of the leaf spring element 14, seen in the forward driving direction 96, includes an eye. A cylindrical metal bolt passes through the eye. Both ends of the metal bolt are guided through two lower bearing bushes 32 of metal arranged at the same height in the retaining bracket 26 so the rear end of the leaf spring element 14 pivots relative to the retaining bracket 26 about a lower transverse axle 34. A rubber filling (not shown) between the plain bearing bushes 28, 32 and the cylindrical metal bolts reduces any noise developing during operation of the longitudinal leaf spring device 10.

A front end 14b of the leaf spring element 14 includes a circular eye that surrounds an outer metal cylinder 38 of a front bearing bush 36. An inner metal cylinder 42 of the front bearing bush 36 is fixedly connected to the chassis of the motor vehicle. A rubber filling 40 between the outer cylinder 38 and the inner cylinder 42 of the front bearing bush 36 enables the front end 14b of the leaf spring element 14 to pivot relative to the chassis, practically without a sound, around a front transverse axle 44.

Figure 2:
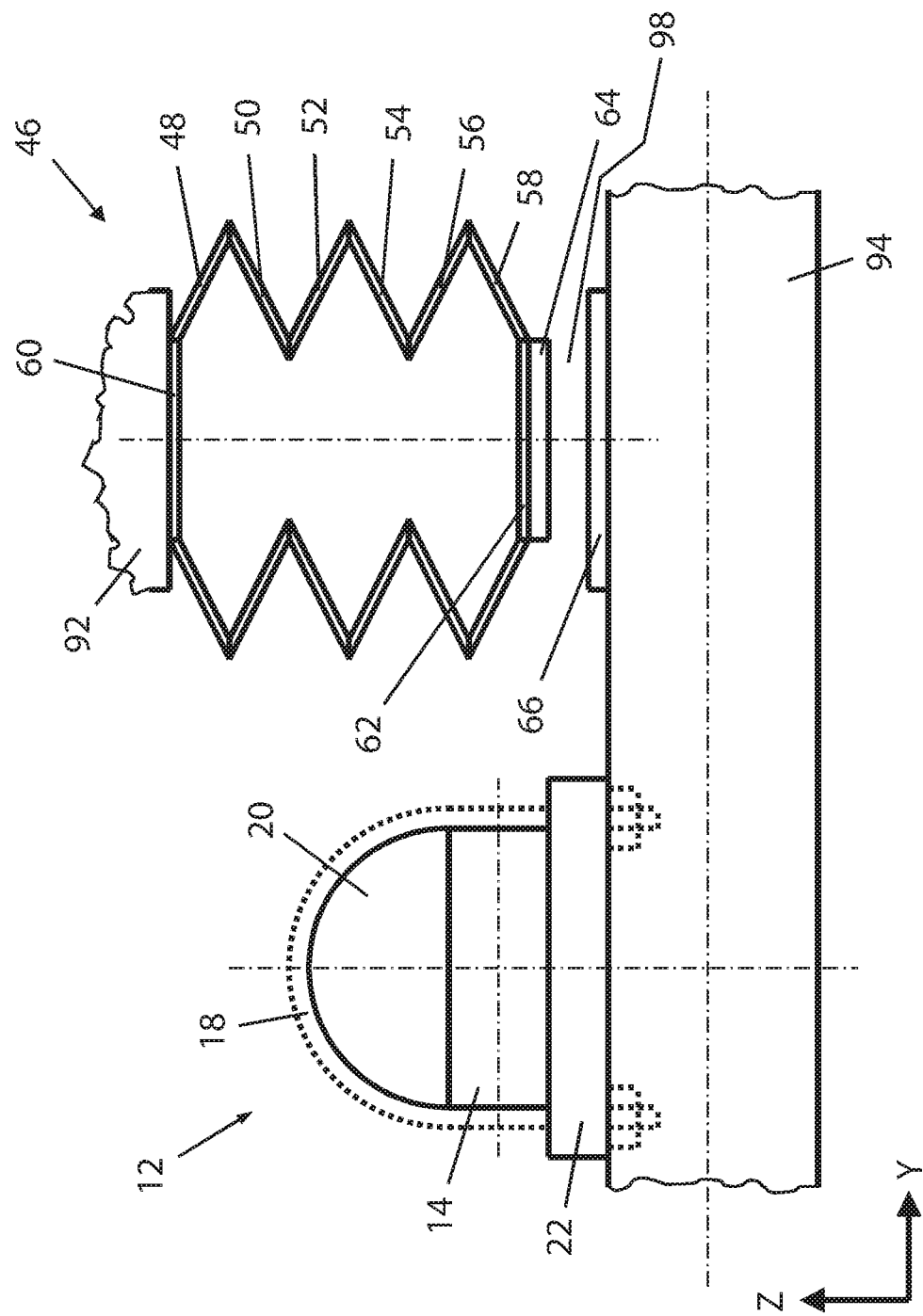
FIG. 2 is a diagrammatic, rear, sectional view, in a plane transverse to the axle of the motor vehicle, of the longitudinal leaf spring device of FIG. 1.

FIG. 2 shows a diagrammatic rear view, in section in a plane transverse to the axle 94 of the motor vehicle, of the longitudinal leaf spring device 10 according to FIG. 1, arranged on the left side of the axle 94.

The longitudinal leaf spring device 10 includes an auxiliary suspension unit 46 spaced from the leaf spring unit 12 in the substantially vertical, Z-direction between the chassis 92 and the axle 94 and in the lateral, Y-direction.

The auxiliary suspension unit 46 includes a plurality of suspension elements 48-58 made from steel, each having a spring-back force in the same direction. The suspension elements 48-58 formed as plate springs of equal size and arranged concentrically, one above the other, in the vertical direction, arranged force-wise in series. A topmost plate spring 48 in the vertical direction is fixed, for example by welding, to a planar, connection element 60 with flat surfaces, for example a circular steel plate. A lowermost plate spring 58 in the vertical direction is likewise fixed, for example by welding, to a connection element 62, also having flat surfaces, for example a circular steel plate. A sound insulation element 64, a surface layer of an elastomer material, for example a chlorobutadiene rubber, is attached by vulcanization to a lower surface of the connection element or circular steel plate 62.

Fasteners, for example bolt or screws, connect the suspension elements 48-58 to the chassis 92 of the motor vehicle. Fastening the connection element 60 to the uppermost plate spring 48 does not detrimentally increase the unsprung mass of the motor vehicle.

A gap 98 exists between the auxiliary suspension unit 46 and the axle 94 of the motor vehicle in a position of the longitudinal leaf spring device 10, shown in FIG. 2, loaded only statically with the body load of the motor vehicle. The auxiliary suspension unit 46 provides, above or exceeding a predetermined first deflection depth—the gap 98, an active connection between the chassis 92 and the axle 94. A sound insulation element 64 of elastomer material not only dampens any noise arising as the active connection is made, the layer thickness of the element 64 as designed appropriately therefor, also dampens impact impulses.

A contact bearing element 66 formed by a circular steel plate and fixed to the axle 94 is provided on the upper side of the axle 94 at a point facing the sound insulation element 64 and the connection element 62 on the lowest plate spring 58.

A diameter of the contact bearing element 66 exceeds a diameter of the sound insulation element 64 ensuring that the connection element 62 on the lowest plate spring reaching and exceeding the predetermined first deflection depth or gap 98 when the sound insulation element 64 and the contact bearing element 66 are in mutual abutment. The contact bearing element 66, if an active connection occurs made between the chassis 92 and the axle 94, positioned adjacent of the auxiliary suspension unit 46, the direction of a spring restoring force generated by the suspension elements 48-58.

On exceeding the predetermined first deflection depth a desired non-linearly progressive spring characteristic can be achieved through the spring properties of the plate springs 48-58.

Figure 3:
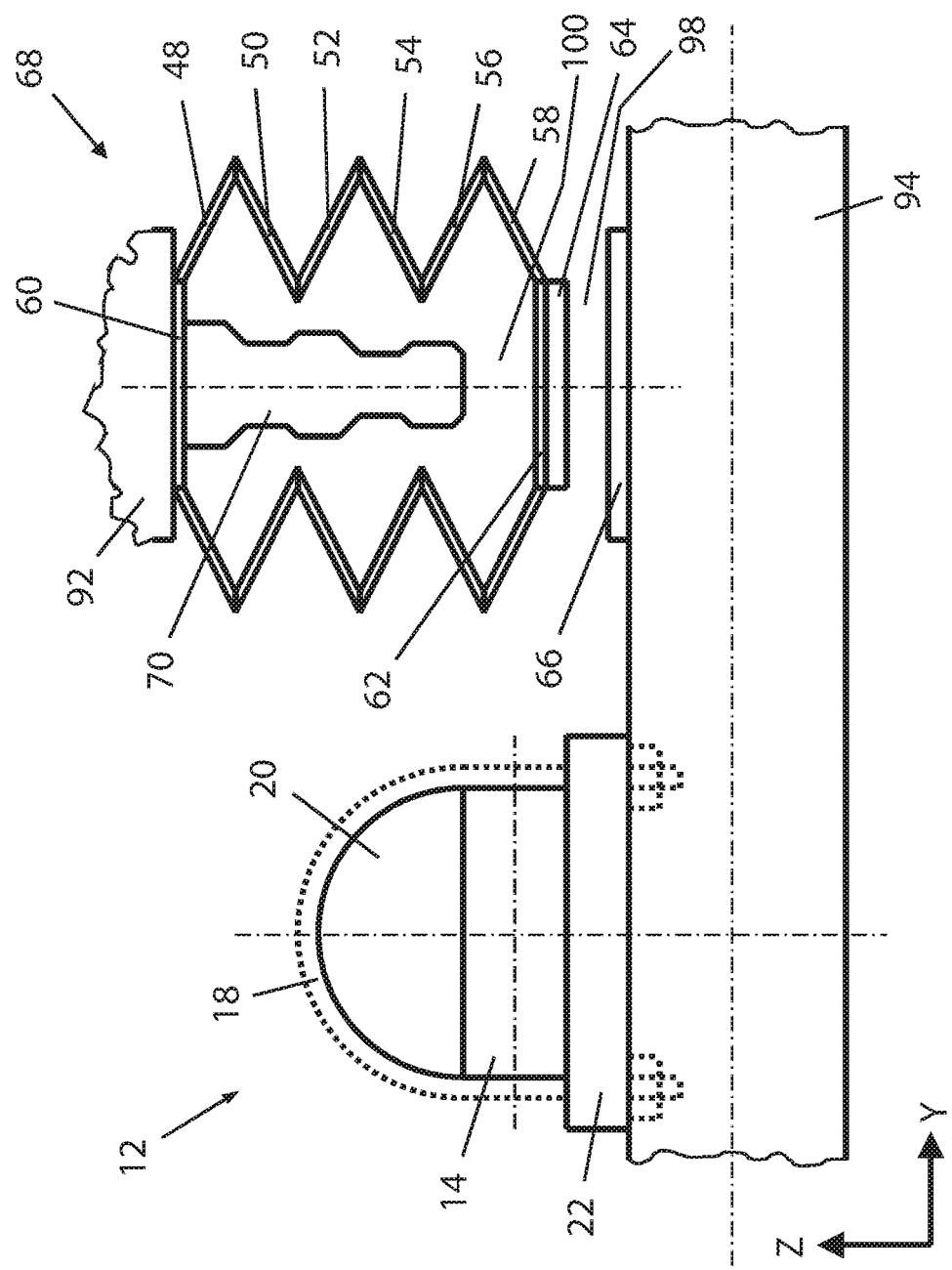
FIG. 3 is a diagrammatic, rear, sectional view of an alternative embodiment of the longitudinal leaf spring device of FIG. 1 in a similar view to FIG. 2.

FIG. 3 shows a diagrammatic, rear view of the longitudinal leaf spring device 10 according to FIG. 1 with an alternative embodiment of an auxiliary suspension unit 68 in a position of the longitudinal leaf spring device 10 loaded only statically with the body load of the motor vehicle, and in the same view as in FIG. 2. To avoid repetitions, only the differences from the preceding embodiment of the auxiliary suspension unit 46 are described.

Different from the auxiliary suspension unit 46 in FIG. 2, the auxiliary suspension unit 68 of FIG. 3 includes suspension element or bumper 70. The suspension element or bumper 70 having a cylindrical or bar shape, for example a post, extending longitudinally downward from the connection element 60 toward the connection element 62. The suspension element or bumper 70 formed from a rubber elastic material, for example butadiene rubber. The suspension element or bumper 70 includes a cross-sectional surface, arranged perpendicular to the length, that changes along its longitudinal length. The suspension element or bumper 70 aligned parallel to the vertical, Z-direction and arranged with one end on an underside of the connection element 60 fixed to the topmost plate spring 48. The length of the suspension element or bumper 70, in the vertical direction, is less than the length of the plurality of plate springs 48-58 producing an additional active connection between the chassis 92 and the axle 94 above or exceeding a predetermined second deflection depth 100 that is greater than the predetermined first deflection depth 98.

A spring characteristic of the auxiliary suspension unit 68 is determined in a region between the predetermined first deflection depth 98 and the predetermined second deflection depth 100 by the superposed plate springs 48-58. With deflection depths above or exceeding the predetermined second deflection depth 100 the spring characteristic of the auxiliary suspension unit 68 is determined by the spring characteristic of the vertically superposed plate springs 48-58, i.e., in series force-wise, with the spring characteristic of the suspension element or bumper 70 arranged force-wise in parallel.

Figure 4:
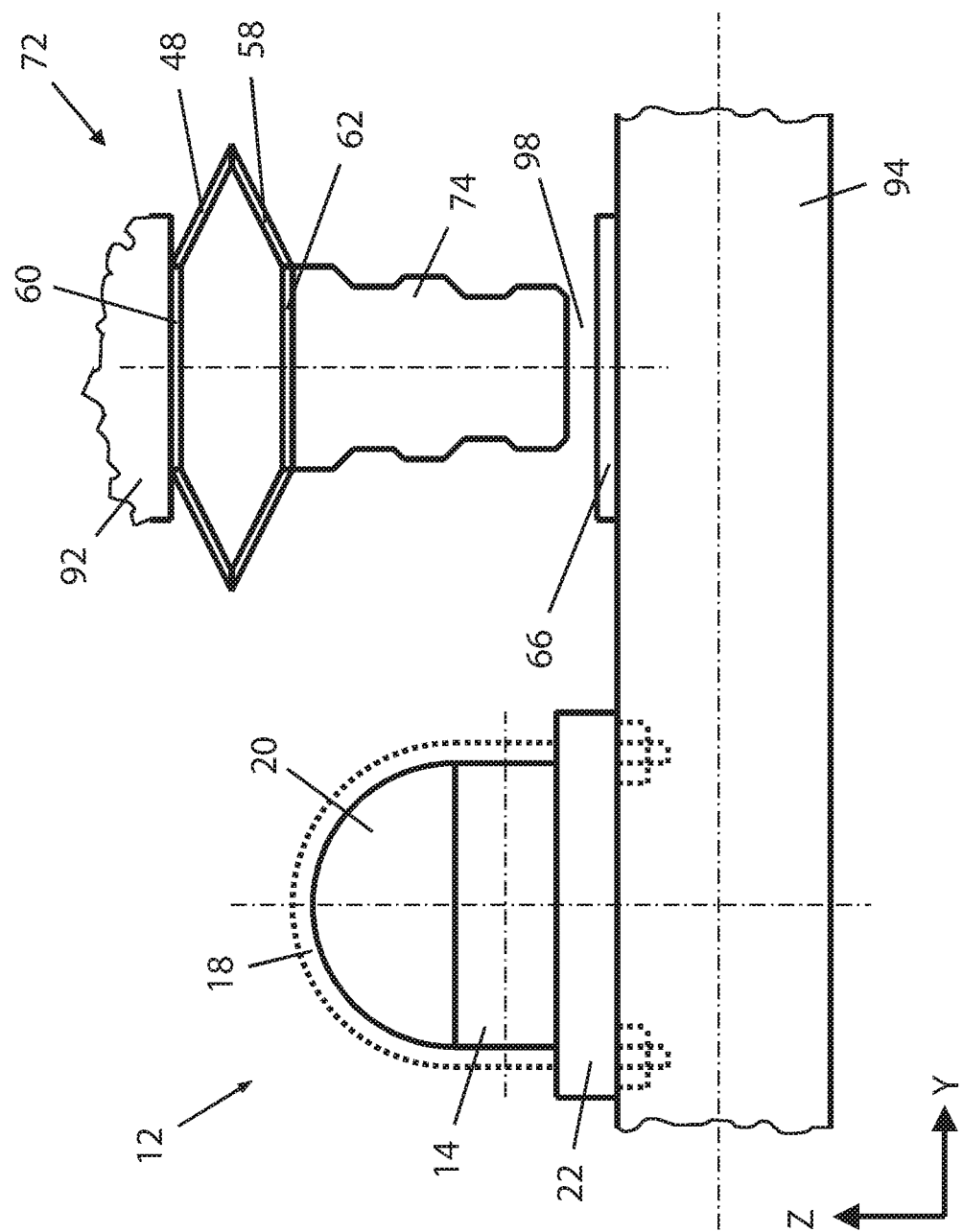
FIG. 4 is a diagrammatic, rear, sectional view of an additional embodiment of the longitudinal leaf spring device according to FIG. 1 in a similar view to FIG. 2.

FIG. 4 shows a diagrammatic, rear view of the longitudinal leaf spring device 10 according to FIG. 1 with a further alternative embodiment of an auxiliary suspension unit 72 in position with the longitudinal leaf spring device 10 statically loaded only with the body load of the motor vehicle and in the same view as in FIG. 2. To avoid repetitions only the differences from the preceding embodiment of the auxiliary suspension unit 68 will be described below.

Different from the auxiliary suspension unit 68 according to FIG. 3, the auxiliary suspension unit 72 of FIG. 4 includes a plurality of, preferably three, suspension elements 48, 58, 74. Two suspension elements 48, 58 are formed as plate springs arranged concentrically in the vertical, Z-direction and in series force-wise. A third suspension element or bumper 74, having a cylindrical or bar shape, for example a post, extends longitudinally downward from the connection element 62 toward the contact bearing element 66. The suspension element or bumper 74 made of an elastomer, for example a rubber elastic material such as butadiene rubber. The suspension element or bumper 74 having a cross-sectional surface arranged perpendicular to its longitudinal length and varying in cohesive portions along its longitudinal length. FIG. 4 shows the suspension element or bumper 74 having circumferential indentations spaced, along its longitudinal length, along an outer surface of the suspension element or bumper 74 in the vertical direction. The suspension element or bumper 74 tapering from top to bottom in the plane of the drawing, with the lower end of the suspension element or bumper 74 closest to the contact bearing element 66. The suspension element or bumper 74 aligned parallel to the vertical, Z-direction and vulcanized at one end on an underside of the connection element 62 fixed to the bottom plate spring 58, wherein a diameter of the suspension element or bumper 74 corresponds at the connection point to a diameter of the connection element 62. Compared with the embodiment of FIG. 3, the instant embodiment needs no sound insulation element on the lower surface of the connection element 62 attached to the bottom plate spring 58.

Upon reaching the predetermined first deflection depth 98 the auxiliary suspension unit 72 produces an active connection between the chassis 92 and the axle 94. The suspension elements 48, 58, 74 arranged force-wise in series for receiving a force introduced into the auxiliary suspension unit 72 through the active connection between the chassis 92 and the axle 94, creating a comparatively soft suspension. With further increases in the deflection depth the spring characteristic of the auxiliary suspension unit 72 determined increasingly from the non-linearly progressive spring properties of suspension element or bumper 74 of rubber elastic material.

Figure 5:
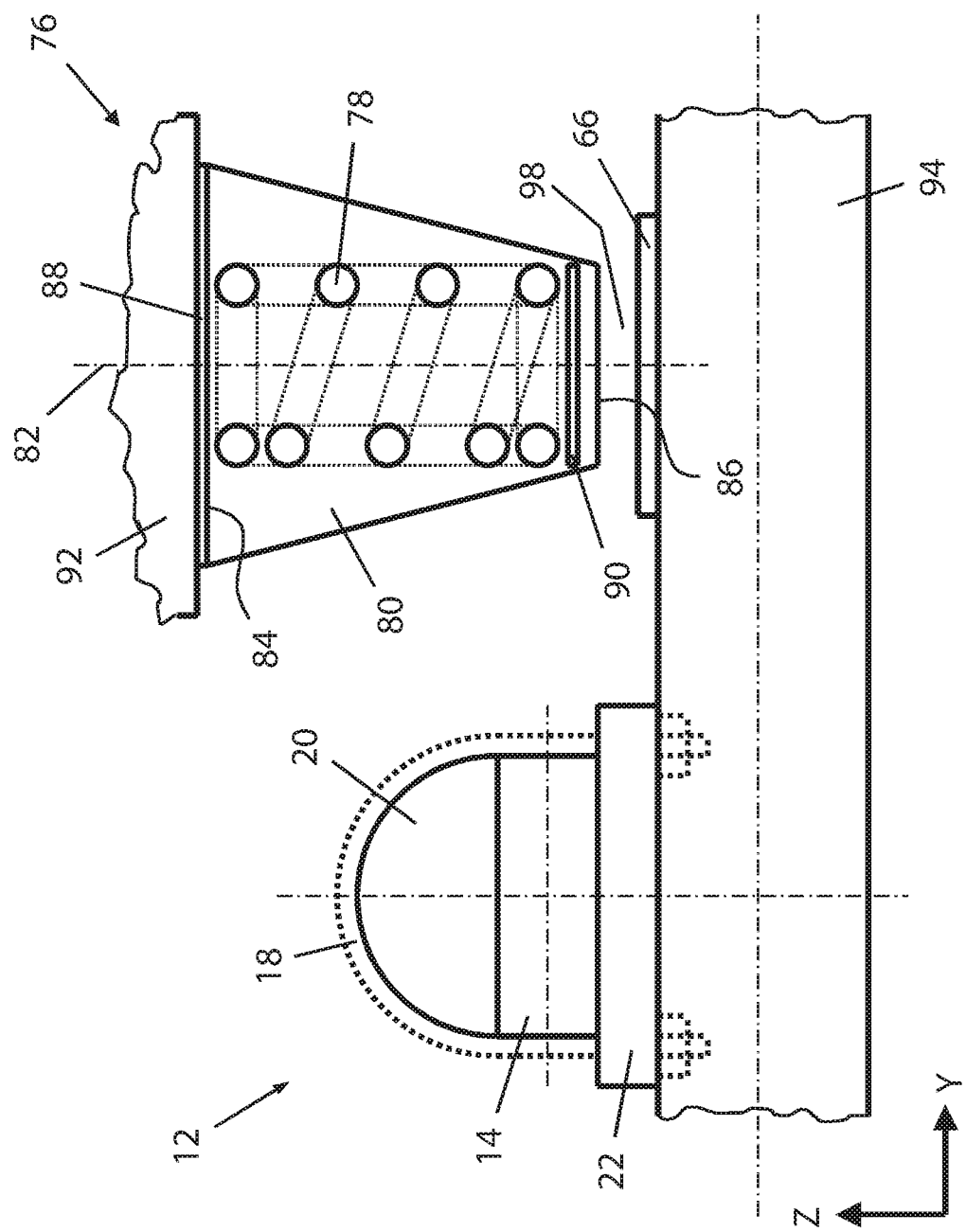
FIG. 5 is a diagrammatic, rear, sectional view of a further embodiment of the longitudinal leaf spring device according to FIG. 1 in a similar view to FIG. 2.

FIG. 5 shows a diagrammatic, rear view of the longitudinal leaf spring device 10 according to FIG. 1 with an additional alternative embodiment of an auxiliary suspension unit 76 in position with the longitudinal leaf spring device 10 statically loaded only with the body load of the motor vehicle and in the same view as in FIG. 2.

The auxiliary suspension unit 76 has a plurality of, preferably two, suspension elements 78, 80. The first suspension element 78 is a coil, compression spring made from spring steel. The second suspension element 80 is a truncated cone formed of a rubber elastic material, for example, chlorobutadiene rubber. Forming the second suspension element 80 includes holding the coil compression spring 78 in a frusto-conical vulcanizing mold with a center line 82 of the coil compression spring 78 coinciding with a center line of the vulcanization mold. After filling the frusto-conical vulcanization mold with the rubber elastic material, using a vulcanization process used to harden the rubber elastic material wherein the first suspension element 78 is embedded in the second suspension element 80 with no inner hollow or cavity formed.

Changes in length, through forces introduced to the auxiliary suspension unit 76 due to an active connection between the chassis 92 and the axle 94 are the same for the first suspension element 78 and the second suspension element 80. The suspension elements 78, 80 are arranged in parallel force-wise.

During production of the second suspension element 80, a connection element 88, a circular steel plate of the same diameter placed adjacent the base surface 84 of the truncated cone, connects the suspension unit 76 to the chassis 92 of the motor vehicle. To reach a uniform surface pressure at the site of the active connection, at a predetermined distance from the top face 86 of the truncated cone, a compensating element 90, a circular steel plate is embedded in the truncated cone of the second suspension element 80.

The rubber elastic material of the second suspension element 80 between the compensating element 90 and the top face 86 of the truncated cone may function as a sound insulation element.

The longitudinal leaf spring device 10 includes an elongated leaf spring unit 12, a coupling device 16 for mechanically coupling the leaf spring unit to a vehicle axle 94 of a motor vehicle, and at least one suspension unit separate from the leaf spring 14, disposed in the vertical direction between a vehicle chassis 92 and the vehicle axle 94.

The suspension unit includes a plurality of suspension elements providing a spring back force in the vertical direction and producing an active connection between the vehicle chassis and axle when deflection therebetween exceeds a predetermined first deflection depth.

"Longitudinal leaf spring device" means a leaf spring device having at least one leaf spring arranged in an installed position in a plane aligned perpendicular to the axle of the motor vehicle.

"Motor vehicle" means a passenger vehicle, a transporter, a goods truck, a tractor, or a bus.

"In a substantially vertical direction" means an extension direction of the suspension unit formed for example by a longest center line or longitudinal axis, deviates from the vertical direction by an angle less than 10°, and more particularly preferred, less than 5°.

"Active connection" means a mechanical connection between at least two objects enabling the transfer of a force and/or a torque between the objects. The transfer can then take place both through direct contact, and indirectly, through an intermediate element.

The terms "first", "second", etc. used in this application serve only for differentiation, the use of these implies no sequence or priority of the objects mentioned in connection with these terms.

The suspension unit provides the vehicle body or chassis with a high driving comfort with both a deflection depth below or not exceeding the predetermined first deflection depth and with a deflection depth that lies above or exceeds the predetermined first deflection depth. The suspension unit achieves a non-linear progressive spring characteristic in a sturdy and structurally comparatively simple, parts-saving manner.

The leaf spring unit can comprise one or more leaf springs which are made, for example, from steel. The leaf spring unit may also include one or more leaf springs made for the most part of a composite material. The term "for the most part" means a proportion of over 50% vol., preferably over 70% vol., and more especially preferred, of over 90% vol. It may also include the possibility where the leaf spring element is made entirely, i.e. up to 100% vol., of composite material.

The composite material may be, for example, a fiber/plastic compound. The composite material may be a carbon fiber reinforced plastic, glass fiber reinforced plastic, and/or aramid fiber reinforced plastic.

In one embodiment, the suspension unit includes a plurality of suspension elements formed as conically arranged plate springs.

In an upper region of a possible spring path of the plate springs their spring characteristic runs in a non-linearly progressive manner whereby a non-linearly progressive spring characteristic can be achieved in a structurally simple manner.

To increase a spring constant of the suspension unit, plate springs of the plurality of plate springs can be arranged in known way in the same direction one above the other, i.e. force-wise in parallel, or to reduce the spring constant in alternating directions, i.e. force-wise in series, whereby a high flexibility can be produced when designing the spring constant of the auxiliary suspension unit.

The plate springs can be made from the same material and have identical dimensions—inner diameter, outer diameter, thickness, and pitch angle. They can however also be made from different materials and/or different dimensions.

One of the suspension elements, for example the bumper, comprises a rubber elastic material. Rubber elastic materials have by nature a non-linear spring characteristic, when a deflection depth above, or exceeding, the predetermined first deflection depth occurs, the suspension unit contributes to a desired non-linearly progressive suspension. Examples of rubber elastic materials are elastomers, rubbers, natural and synthetic rubber and silicon rubber.

The suspension element or bumper of the plurality of suspension elements may have a bar-like design, for example a bumper having a having a cylindrical or bar—rectangular or square cross-sectional shape, for example a post. The bumper can contain rubber elastic material in at least one cohesive portion of an extension length of the suspension element. The suspension element or bumper may also be made completely from a rubber elastic material or from several rubber elastic materials.

The cross-sectional shape of the suspension element or bumper may vary or change along its longitudinal axis or extension length. For example, changing the cross-section along portions of the bumper open further possibilities for designing a desired spring characteristic of the suspension unit.

The suspension element of the plurality of suspension elements comprising the rubber elastic material is provided to produce an active connection between the chassis and the axle above or exceeding a predetermined second deflection depth greater than the predetermined first deflection depth, making it possible to achieve a stepped increase in the non-linearly progressive spring characteristic of the suspension unit that is dependent on reaching predetermined deflection depths.

In preferred embodiments of the longitudinal leaf spring device the suspension element, having the rubber elastic material, introduces a force into the suspension unit through the creation of the active connection between the chassis and the axle, the elements arranged force-wise in series with at least one other suspension element. Further possibilities can be provided for designing a desired spring characteristic of the auxiliary suspension unit.

One suspension element of the plurality of suspension elements may be a coil spring with an additional suspension element formed from rubber elastic material. The coil spring is embedded; i.e., without forming an inner cavity, in the rubber elastic material.

Connecting the coil spring and rubber elastic material in this manner allows both to deform in the same way if a deflection depth occurs exceeding or above the predetermined first deflection depth. They are arranged force-wise in parallel. This arrangement enables a compact structure of a suspension unit having non-linearly progressive spring characteristics and low space requirements. The coil spring and rubber elastic material can be arranged so the respective center lines coincide.

A contact bearing element is provided in the longitudinal leaf spring device and arranged adjacent, in front of, the suspension unit—in the area where the active connection is produced between the chassis and the axle, seen in the direction of at least one spring force of the plurality of suspension elements.

The contact bearing element on reaching the predetermined first deflection depth cooperates with the suspension unit producing the active connection between the chassis and the axle in a defined manner, for example, the contact bearing element may generate a uniform flat surface pressure at the site of the active connection.

If the suspension unit is fastened to the vehicle chassis of the motor vehicle then the contact bearing element can be fixedly connected to the axle of the motor vehicle. If the suspension unit is fastened on the vehicle axle of the motor vehicle, the contact bearing element can be fixedly connected to the vehicle chassis of the motor vehicle.

The longitudinal leaf spring device includes a connection element having a level surface fixed to one suspension element of the plurality of suspension elements. Using a connection element having a level surface introduces a force into the longitudinal leaf spring device having a uniform flat surface pressure during an existing active connection between the chassis and the axle. The connection element can be made from a metal material, for example, steel.

The suspension elements of the suspension unit are preferably attached to the vehicle chassis of the motor vehicle keeping any increase in the unsprung mass of the motor vehicle through the suspension unit low.

In a further aspect of the invention a motor vehicle is provided that has at least one pair of longitudinal leaf spring devices and coupled to an axle of the motor vehicle. The suspension elements of the at least one auxiliary suspension unit are arranged between the vehicle chassis and the vehicle axle of the motor vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A longitudinal leaf spring device for use with a vehicle comprising:
   an elongated leaf spring,
   a vehicle axle;
   a coupler connecting the leaf spring to the vehicle axle;
   a suspension unit, separate from said elongated leaf spring, positioned vertically between a vehicle chassis and the vehicle axle, the suspension unit having a plurality of suspension elements exerting a spring-back force, the suspension unit connected to said vehicle chassis and having a free end spaced from said vehicle axle at a predetermined first deflection depth between the free end of the suspension unit and the vehicle axle; and
   said suspension unit includes a plurality of concentrically arranged plate springs.

2. The longitudinal leaf spring device of claim 1 wherein said suspension unit includes an elastomeric element, the elastomeric element including a rubber material.

3. The longitudinal leaf spring device of claim 2 wherein a free end of the elastomeric element is spaced from said free end of said suspension unit at a predetermined second deflection depth, the predetermined second deflection depth is greater than the predetermined first deflection depth.

4. The longitudinal leaf spring device of claim 1 including a first connection element connecting a topmost plate spring to the vehicle chassis; and
   an elastomeric element, secured to a second connection element connected to a lowermost plate spring at an opposite end of said concentrically arranged plate springs, said elastomeric element having a free end spaced said predetermined first deflection depth wherein during an active connection between the vehicle chassis and the vehicle axle the suspension unit is arranged force-wise in series.

5. The longitudinal leaf spring device of claim 1 including a contact bearing element on the vehicle axle arranged adjacent the free end of the suspension unit in a direction of a return spring force of the suspension elements.

6. The longitudinal leaf spring device of claim 1 including a connection element having a planar surface fixed to a plate spring.

7. The longitudinal leaf spring device of claim 1 including an insulation element connected to said suspension unit forming a part of said free end of said suspension unit.

8. A vehicle suspension comprising:
   an elongated leaf spring,
   a vehicle axle;
   a vehicle chassis;
   a coupler connecting the leaf spring to the vehicle axle;
   a suspension unit, separate from said leaf spring, fixed to and depending vertically from said vehicle chassis, said suspension unit including a plurality of concentrically aligned plate springs, a topmost plate spring connected to said vehicle chassis; and
   a lowermost plate spring and a connection element fixed to the lowermost plate spring forming a free end of said suspension unit spaced from said vehicle axle at a predetermined first deflection depth.

9. The vehicle suspension of claim 8 wherein said suspension unit includes a bumper fixed on one end to the vehicle chassis, said bumper having a free end spaced from said vehicle axle a predetermined second deflection depth, said connection element positioned between said free end of said bumper and said vehicle axle.

10. The vehicle suspension of claim 9, wherein said second deflection depth is greater than said predetermined first deflection depth.

11. A vehicle suspension comprising:
    an elongated leaf spring,
    a vehicle axle;
    a vehicle chassis;
    a coupler connecting the leaf spring to the vehicle axle;
    a suspension unit, separate from said leaf spring, fixed to and depending vertically from said vehicle chassis, said suspension unit including a plurality of concentrically aligned plate springs, a topmost plate spring connected to said vehicle chassis; and
    a lowermost plate spring and a connection element fixed to the lowermost plate spring; and
    said suspension unit includes a bumper fixed to said connection element, said bumper having a free end, said free end of said bumper forming a free end of said suspension unit spaced from said vehicle axle at a predetermined first deflection depth, said bumper positioned between said plurality of concentrically aligned plate springs and said vehicle axle.

* * * * *